US008250017B2

(12) United States Patent
Pandey et al.

(10) Patent No.: US 8,250,017 B2
(45) Date of Patent: Aug. 21, 2012

(54) SYSTEM AND METHOD FOR PREDICTION OF GAS TURBINE TRIPS DUE TO GAS CONTROL VALVE FAILURES

(75) Inventors: Achalesh Kumar Pandey, Bangalore (IN); Ravi Yoganatha Babu, Bangalore (IN); Vinay Bhaskar Jammu, Bangalore (IN); Slawomir Marian Zaremba, Marietta, GA (US)

(73) Assignee: General Electric Company, Niskayuna, NY (US)

( * ) Notice: Subject to any disclaimer, the term of this patent is extended or adjusted under 35 U.S.C. 154(b) by 1049 days.

(21) Appl. No.: 11/843,951

(22) Filed: Aug. 23, 2007

(65) Prior Publication Data

US 2009/0055130 A1 Feb. 26, 2009

(51) Int. Cl.
*G06F 17/00* (2006.01)
*G06N 5/02* (2006.01)

(52) U.S. Cl. ............................ 706/47; 702/140; 701/100

(58) Field of Classification Search .................... 706/47; 60/782; 431/12
See application file for complete search history.

(56) References Cited

U.S. PATENT DOCUMENTS

| 2003/0014692 A1* | 1/2003 | James et al. ..................... 714/25 |
| 2004/0107702 A1* | 6/2004 | Nichols et al. .................. 60/782 |
| 2006/0080965 A1 | 4/2006 | Healy .............................. 60/773 |
| 2008/0098746 A1* | 5/2008 | Iasillo et al. .................... 60/776 |

* cited by examiner

*Primary Examiner* — Kakali Chaki
*Assistant Examiner* — Kalpana Bharadwaj
(74) *Attorney, Agent, or Firm* — Ann M. Agosti (57) ABSTRACT

Systems and methods for prediction of gas turbine trips due to component failures such as electro-hydraulic valve (gas control valve) system failures. Exemplary embodiments include prediction of gas turbine trips due to component failures, the method including collecting raw gas turbine operational data and using the raw gas turbine operational data to generate a prognostic indicator for the prediction of a turbine trip due to the failed gas control valves.

22 Claims, 8 Drawing Sheets

| Prognostic Band | % False Positive (Av / Max) | % False Negative Time (Av / Max) | Lead Time (min) | Belief |
|---|---|---|---|---|
| No Trip | 0 | 0 | >180 | <0.001 |
| Low | 0.81/8.92 | 1.27/11.06 | 20-30 | 0.001<=Belief <0.1 |
| High | 0.0/0.0 | 17.93/49.9 | 0-20 | Belief >= 0.1 |

```
False Positive          TTR: 60 min          TTR: 30 min     False Negative
| Early Prediction    |    Correct Prediction    |    Late Prediction |

False Positive          TTR: 30 min          TTR: 20 min     False Negative
| Early Prediction    |    Correct Prediction    |    Late Prediction |
```

FIG. 5C

Trip Lead Time in Minutes

- Average: 45 min
- Minimum: 0.133 min
- Maximum: 180 min

FIG. 6B
Hydraulic Circuit

FIG. 6A
GCV Schematics

SYSTEM AND METHOD FOR PREDICTION OF GAS TURBINE TRIPS DUE TO GAS CONTROL VALVE FAILURES

BACKGROUND

The present disclosure generally relates to systems and methods for prediction of gas turbine trips due to component failures such as electro-hydraulic valve (gas control valve) system failures.

Gas Turbines are the main power producing components for combined cycle/independent power plants. A mixture of air and fuel is burnt in the combustor to produce thermal/heat that is converted into mechanical energy in the several stages of the turbine. Since the firing temperature of the combustor is very high (in the range of 1300-2200° F. (704-1204° C.)), the state of the combustor is measured by mounting thermocouples (TC) in the turbine exhaust. A dedicated controller assesses the state of the combustion process from these thermocouples and further determines if there are any abnormal operations in the combustor. If there is any abnormal event, it warrants immediate shut down of the combustor, hence the gas turbine trip initiates, which is a rapid and uncontrolled shutdown of a gas turbine to protect damaging of gas turbine components or the whole system. Fuel/Gas Control Valves (GCV) and Inlet Guide Vanes (IGV) are used to control the amount of fuel and air supplied to the combustors. Electro-hydraulic servo actuators are used to control GCV and IGV, which reside in a closed loop controller circuit. Since system/component failure in the controller circuit can cause damage to the gas turbine, most of the components have some form of indicator to feedback (e.g., Linear Variable Differential Transducer (LVDT)). Their responses to the feedback are received in the controller circuit, allowing corrections or updates. In the control loop, different components of the GCV (like electro-hydraulic servo valve, position indicator and fuel control actuator, etc.) may fail providing an erroneous reading, and the controller tries to balance the error in the closed loop circuit, which can cause damage to the other system. The controller initiates a trip to prevent damage to the turbine. Many existing servo system monitoring and diagnostics do not predict trips due to the aforementioned failures. For example, gas control valve related problems can cause the combustion instability due to improper air to fuel ratio, which will result in gas turbine trip. Similarly GCV related issues may also lead to GCV not tracking trips because controller will trip the turbine when gas control valve command and feedback error is exceeding some threshold value for some time delay. A trip is a rapid uncontrolled shutdown of the gas turbine that is initiated by the turbine controller to protect the turbine from failures. In general, there can be several types of failure modes for a gas control valve system such as mechanical actuator leakages, mechanical jamming, servo issues, filter choking, loose wiring, LVDT failures etc. In many circumstances, operators typically cannot predict trips due to GCV system failures.

Unwarranted trips, as mentioned above, can cause revenue loss and also have the adverse effect of reducing life of turbine components. Hence, there is a need for predicting an impending trip reliably and preventing loss of useful life of a gas turbine.

SUMMARY

Disclosed herein is a method for the prediction of gas turbine trips due to gas control valve failures, the method including collecting raw gas turbine operational data and using the raw gas turbine operational data to generate a prognostic indicator for the prediction of a turbine trip due to the failed gas control valves.

Further disclosed herein is, a system for the prediction of gas turbine trips due to gas control valve failures, the system including a turbine, a local computer coupled to the turbine for collecting raw turbine operational data related to a gas control valve failure from the turbine, a remote computer coupled to the local computer, a process, residing on the local computer, for computing a prediction of trips, the process including instructions to generate a prognostic indicator for the prediction of a turbine trip due to the failed gas control valves and a database coupled to the remote computer for storing information related to a trip of the turbine.

Further disclosed herein is a method in a power plant having a turbine having components, for the prediction of gas turbine trips due to gas control valve failures, the method the method including collecting gas control valve failure data having failure signatures from the turbine for collection in a remote computer, processing the gas control valve failure data to extract features based on the failure signatures and based on domain knowledge of the turbine, applying a rule set on the extracted features based on apriori probability and the domain knowledge and determining a fused belief of failure calculated from the rule set applied to the extracted features.

BRIEF DESCRIPTION OF THE DRAWINGS

The disclosure and embodiments thereof will become apparent from the following description and the appended drawings, in which the like elements are numbered alike.

DETAILED DESCRIPTION

The present disclosure provides detection of GCV system failures at incipient phase, identification of the root causes of the failure (diagnosis), and prediction of impending gas turbine trips. As further discussed below, the present disclosure further provides detection, identification and prediction for other types of failures and causes of trips including but not limited to GCV not following command signals; high exhaust pressures, etc. Unwarranted trips that cause revenue loss and loss of useful life can therefore be reduced or eliminated. Real time diagnostics, prognostics and a case logging platform that prognoses and provides suitable recommendations for impending trips in gas turbines arising from GCV system failures is provided. In exemplary implementations, the systems and methods proactively detects GCV system failures, extract several signatures from the gas turbine, and then fuse these features to determine the time to trip.

The present disclosure further provides the detection of GCV failures associated electro hydraulic servo system faults, in their incipient phase, identification the root cause of the failure (diagnosis) and prediction of any impending gas turbine trips. There can be several failure modes in the gas control circuit such as, but not limited to: sticking of spool due to poor hydraulic oil quality; LVDT failures (e.g., a loose connection, shorting, etc.); sticking and severed valve stem condition; servo coil failure (grounding, open circuit, loose connection, etc.); last chance filter choking; hydraulic supply pressure loss/fluctuation; null bias drift; flapper nozzle choking; air ingress in hydraulic system, etc. Real time diagnostics, prognostics and suitable recommendations for impending trips in gas turbines arising from faulty GCV, position feedback sensors (LVDT), and associated electro hydraulic servo control system are provided.

Figure 1:
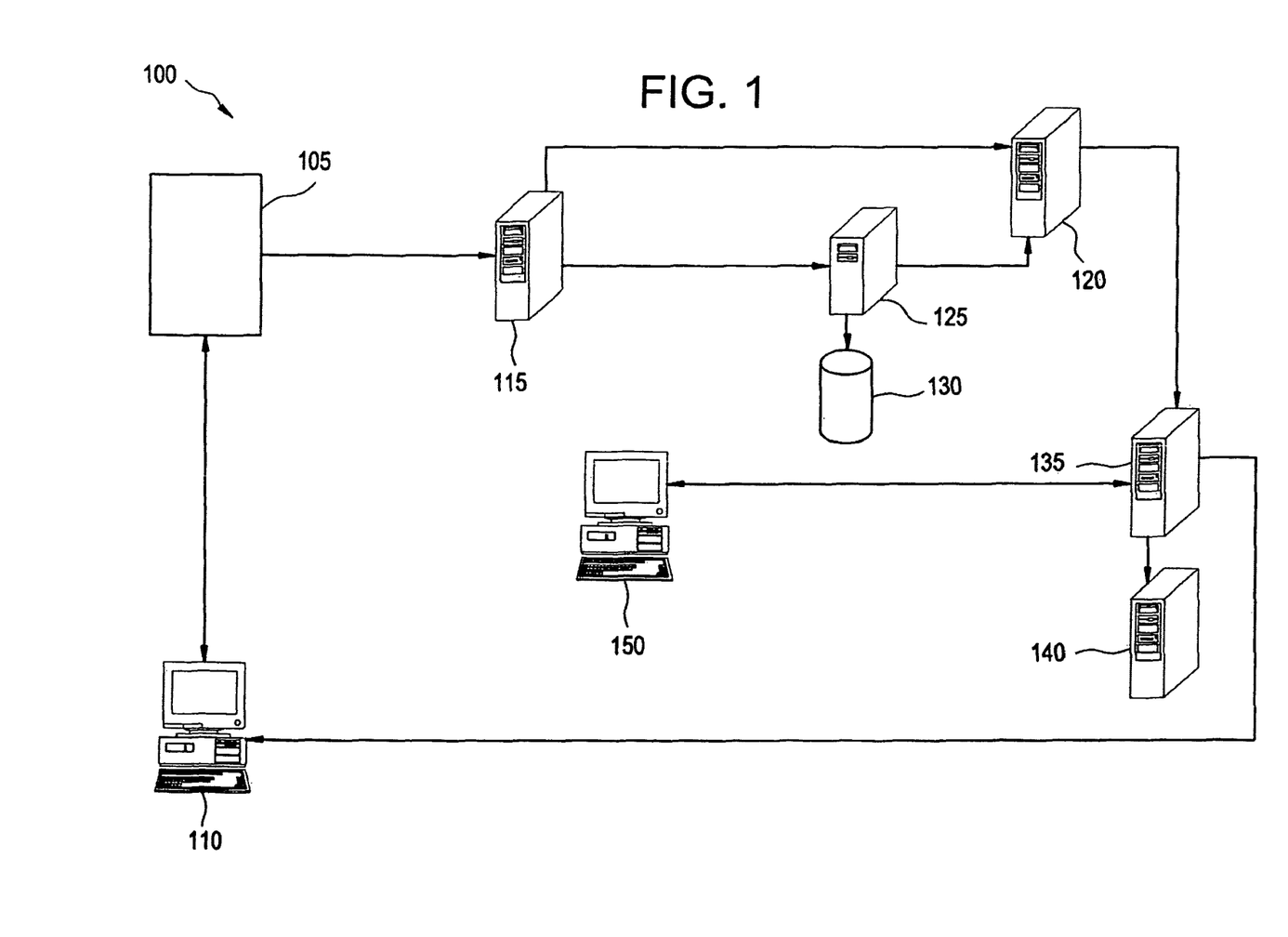
FIG. 1 illustrates an exemplary embodiment of a trip prediction system.

FIG. 1 illustrates an exemplary embodiment of a trip prediction system 100. In general, system 100 analyzes and prepares data that predict turbine trips and recommends time-to-trip in advance and suggests suitable recommendations, so that the trip can be avoided or graceful shutdown can be taken. System 100 includes turbine 105 that is coupled to a technician computer 110. Turbine 105 is further coupled to a local computer 115 into which gas turbine operational data are collected in real time and fed to developed algorithms, which are running on local computer 115. Local computer 115 reads failure signatures from the failed components, the gas turbine parameters and calculated features that are indicative of failure events. Local computer 115 is further coupled to a remote computer 120 to which relevant fault data is transmitted. Remote computer 120 uses expert rules and interacts with a case base reasoning (CBR) system 125 that provides suitable case data to reinforce the prediction from the rule engine and provides diagnostic recommendations. Remote computer 120 is further coupled to a clarification server 135, which is coupled to a failure reporting computer 140, the computers in combination providing clarifications of failures, trip reduction analyses and service recommendations to a service computer 150. In general, remote computer 120 and clarification server 135 can provide messages to concerned personnel such as an operator of technician computer 110 indicating recommended action based on the processed turbine data that has been analyzed and a time-to-trip that has been calculated. Whenever the algorithms capture an incipient failure (of a sensor or a system), it raises a time to trip indicator, which is sent to a remote case logging and reporting system to provide suitable trip mitigation recommendations. In this way, appropriate action can be taken, such as but not limited to, a graceful shutdown, and repairing the identified problem before a trip is initiated. A services database 130, which contains the record of the trip cases and the follow-up corrective actions for maintaining a history and audit trail, can be maintained. Whenever system 100 raises an indication of an impending trip condition, a case is registered or updated (depending upon when was the last case opened) in the service database with the diagnostics and recommendations (from the rule based engine), which can be used by the site personnel or people responsible for taking suitable recommended actions.

Figure 2:
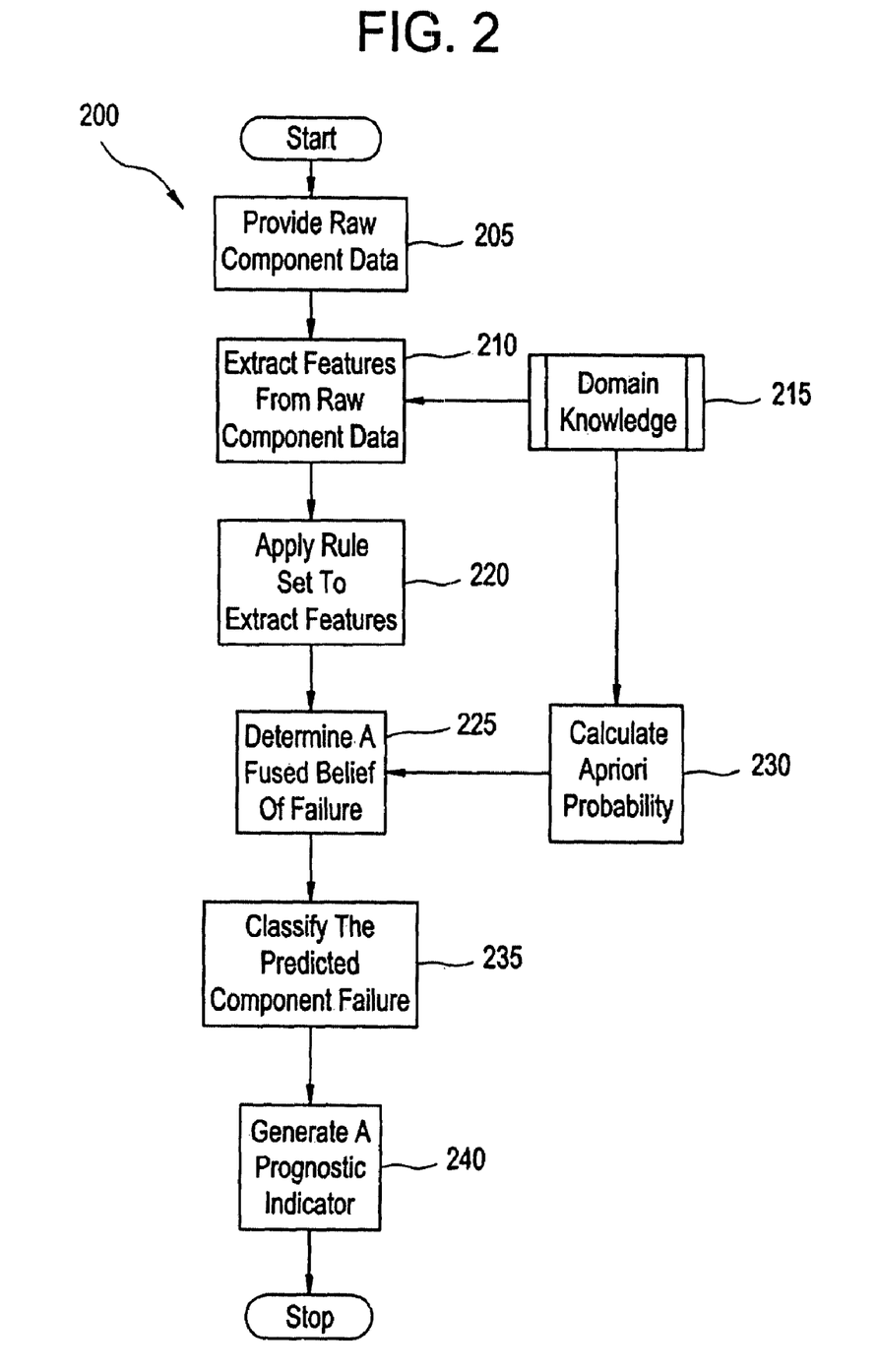
FIG. 2 illustrates an exemplary method for trip prediction due component failure.
Figure 3:
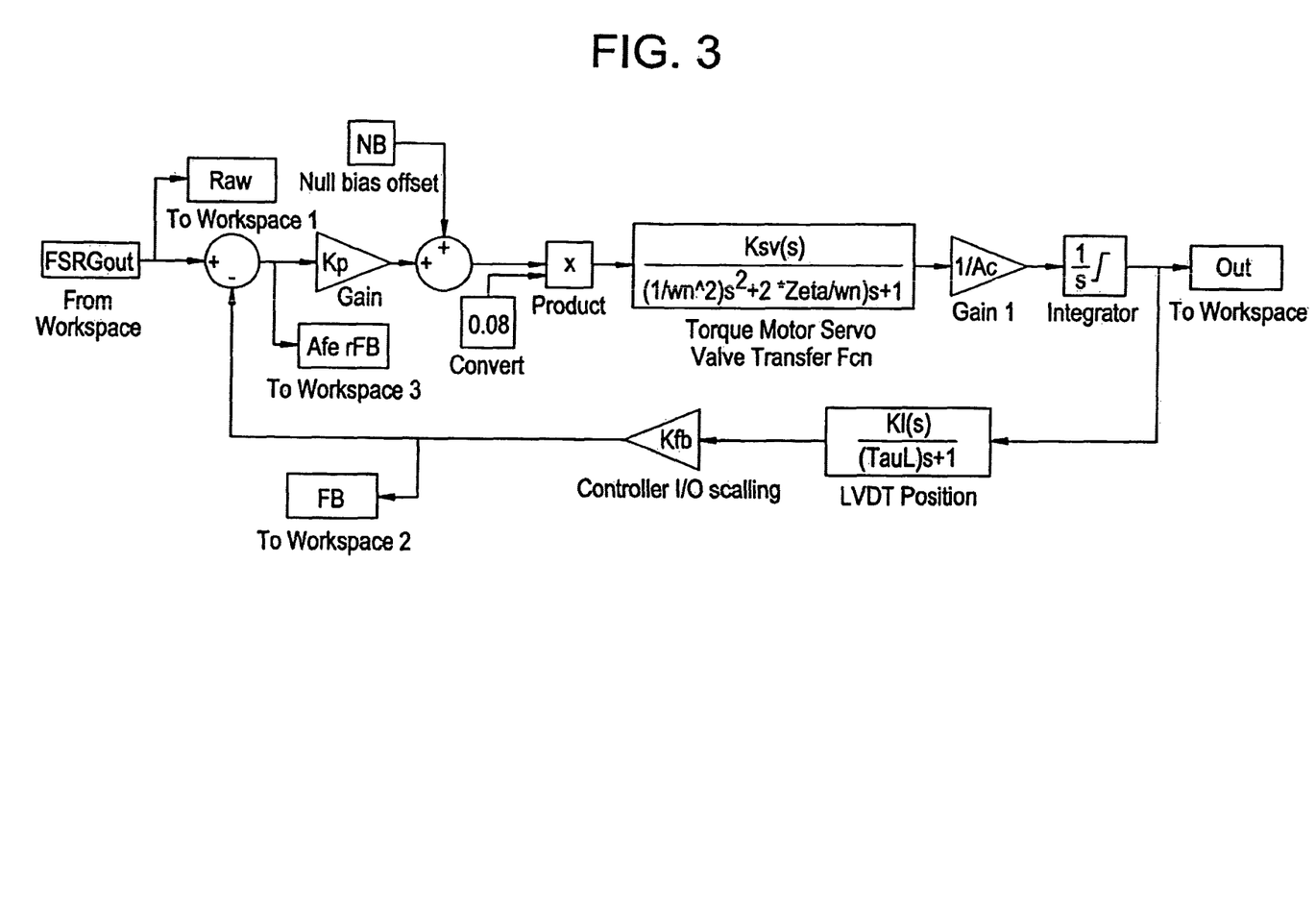
FIG. 3 illustrates details of the servo model.

FIG. 2 illustrates an exemplary method 200 for trip prediction due component failure. At step 205, raw component data, which can be indicative of component failure is collected in the local computer 115 from the turbine 105. At step 210, features are extracted from the raw data and collected in the local computer 115, based on domain knowledge provided at step 215. Physics-based methods, such as but not limited to: gas turbine swirl angle relationship, electro hydraulic servo system, and actuator first principle based models, gas turbine cycle deck models, etc., are used to identify the features whenever there is an incipient failure. Other than physics based methods, parameter estimation, method like Auto-Regression Exogeneous Input (ARX) etc. methods are also used to estimate parameters, which are used as features and indicators of impending failure in GCV. FIG. 3 illustrates details of the servo model. The following expression represent dynamic characteristics of servo valves:

$$Q_B = Q_3 - Q_4$$
$$= c_{v3} sg(-x_v) \text{sign}(p_s - p_B)\sqrt{|p_s - p_B|} -$$
$$c_{v4} sg(-x_v) \text{sign}(p_B - p_T)\sqrt{|p_B - p_T|}$$
$$Q_A = Q_1 - Q_2$$
$$= c_{v1} sg(x_v)\text{sign}(p_s - p_A)\sqrt{|p_s - p_A|} -$$
$$c_{v2} sg(-x_v)\text{sign}(p_A - p_T)\sqrt{|p_A - p_T|}$$
$$\frac{1}{\omega_v^2}\ddot{x}_v^* + \frac{2D_v}{\omega_v}\dot{x}_v^* + x_v^* + f_{hs}\text{sign}(\dot{x}_v^*) = K_v u_v$$

where $c_v$ is the valve flow coefficient, X, is the spool valve position, $\omega_v$ is the natural frequency $D_v$ is the damping coefficient, $K_v$ is the valve gain, and $f_{hs}$ is the valve hysteresis and response sensitivity.

Figure 4:
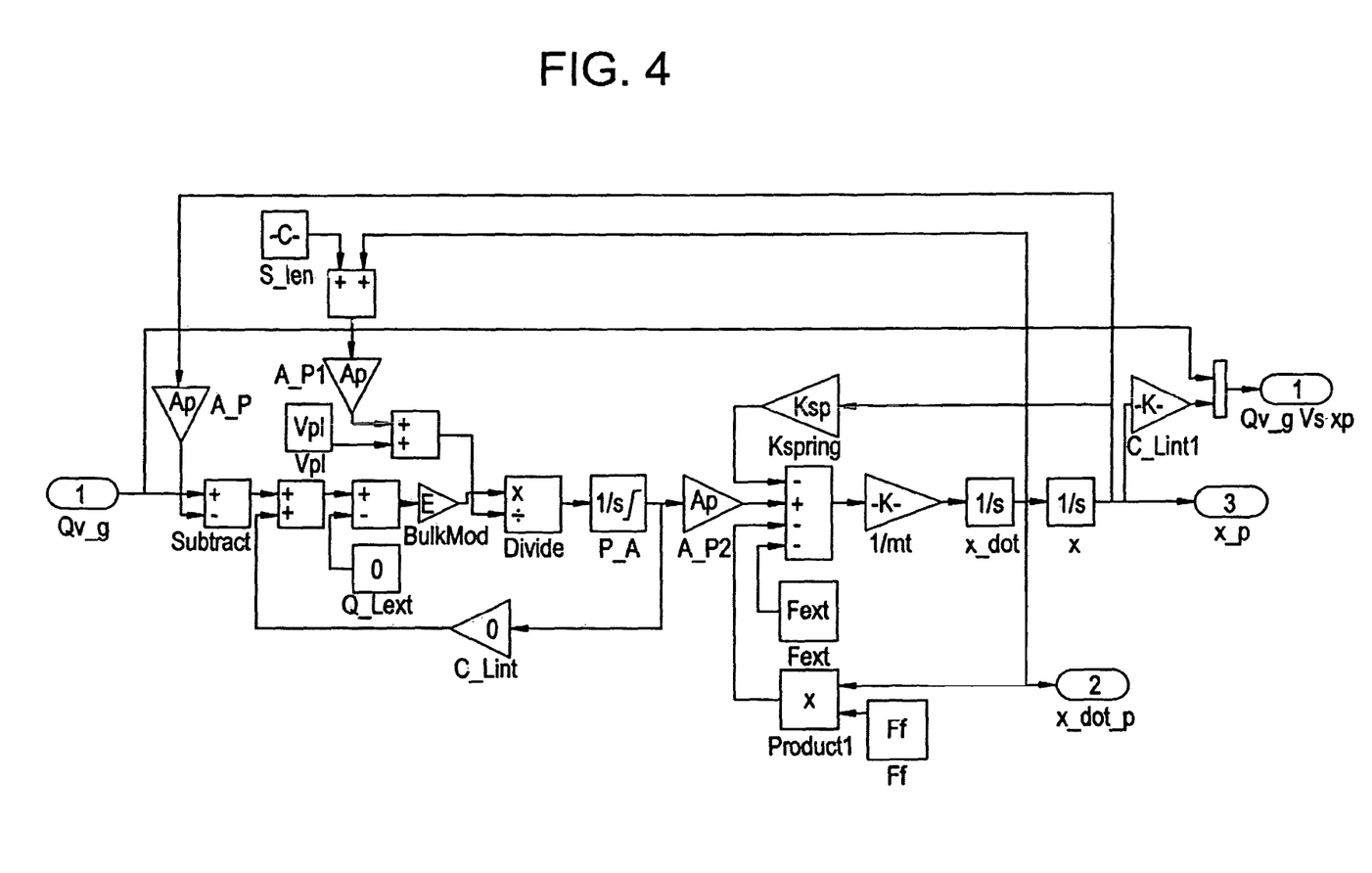
FIG. 4 illustrates details of the cylinder model.

FIG. 4 illustrates details of the cylinder model. The following expression represent dynamic characteristics of cylinders:

$$Q_A - Q_{Li} = \dot{V}_A + \frac{V_A}{E'(p_A)}\dot{p}_A \qquad 6$$
$$Q_B + Q_{Li} - Q_{Le} = \dot{V}_B + \frac{V_B}{E'(p_B)}\dot{p}_B$$
$$V_A = V_{pl,A} + \left(\frac{S}{2} + x_p\right)A_p = V_{Ao} + x_p A_p$$
$$V_B = V_{pl,B} + \left(\frac{S}{2} - x_p\right)\alpha A_p = V_{Bo} - x_p \alpha A_p$$

where $Q_A$ and $Q_B$ are the flow at A, B, $V_A$ and $V_B$ are the volume of piston chamber A, B, $Q_{Li}$ and $Q_{Le}$, are the Leakage flow Internal and External, $E'(p_A)$ and $E'(p_B)$ are the effective bulk modulus and $p_A$ and $p_B$ are the effective pressure at A, B.

When considering the piston motion model, the following expression is considered:

$$m_t \ddot{x}_p + F_f(\dot{x}_p) = (p_A - \alpha p_B)A_p - F_{ext}$$

where $m_t$ is the total mass, $\ddot{x}_p$ is the acceleration of the piston, $F_f$ is the frictional force, $\dot{x}_p$ is the velocity of the piston, $\alpha$ is the viscosity-pressure coefficient, $A_p$ is the area of the piston and $F_{ext}$ is external force.

Statistics-based methods, such as Bayesian Fusion, Neamen Pearson Method, Demster Schaffer method, etc., are used to fuse those features leading to one indicator, which can be tracked over time. The progression of these indicators as they cross thresholds (which comes from domain knowledge and experience) is used to raise flags or time to trip indications. The failure signatures from the failed components are understood in the context of the gas turbine controller algorithms and used to computer features that provide significant progression with impending trips. At step 220, a rule set is applied to the extracted features, which in general, occurs at remote computer 120. At step 225, a fused belief of failure is determined. In this context, a belief of failure of failure is a conditional probability of failure based on domain knowledge of the turbine 105 as well probability that has been calculated beforehand, as is now further discussed. Domain knowledge at step 215 as well as a calculated apriori probability at step 230 are used in determining the fused belief of failure at step 225. The fused belief is a probability based on a combination of the domain knowledge and apriori probability. In one exemplary implementation, as the algorithms described in the document along with one of the indicator cumulative error between command and feedback. As the feature values increases the trip probability increases to value of 1 about 30 minutes before the actual trip occurred.

Figure 5A:
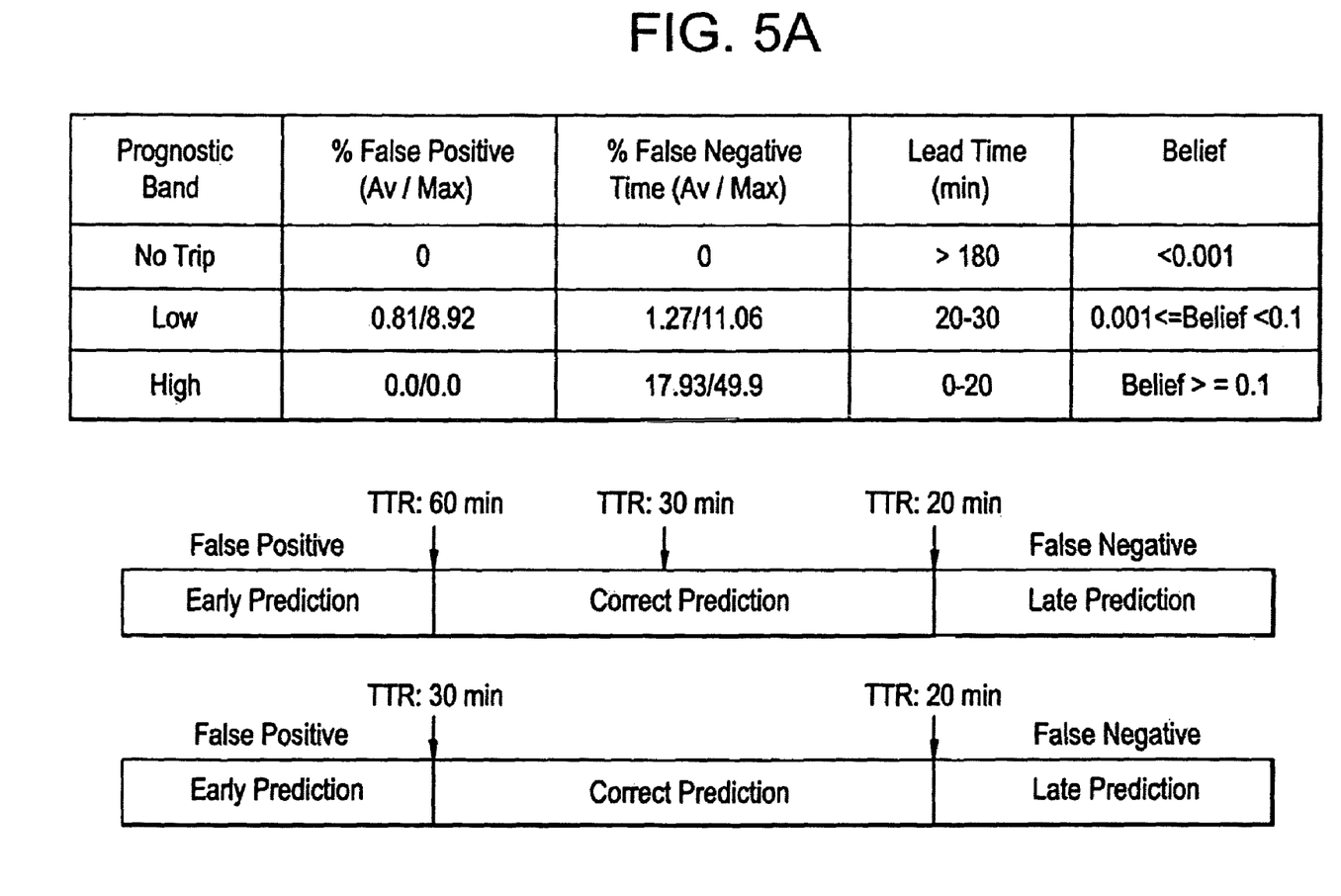
FIG. 5A illustrates a table that associates prognostic bands with belief thresholds and lead-time ranges, as well as false positive and negative thresholds.
Figure 5B:
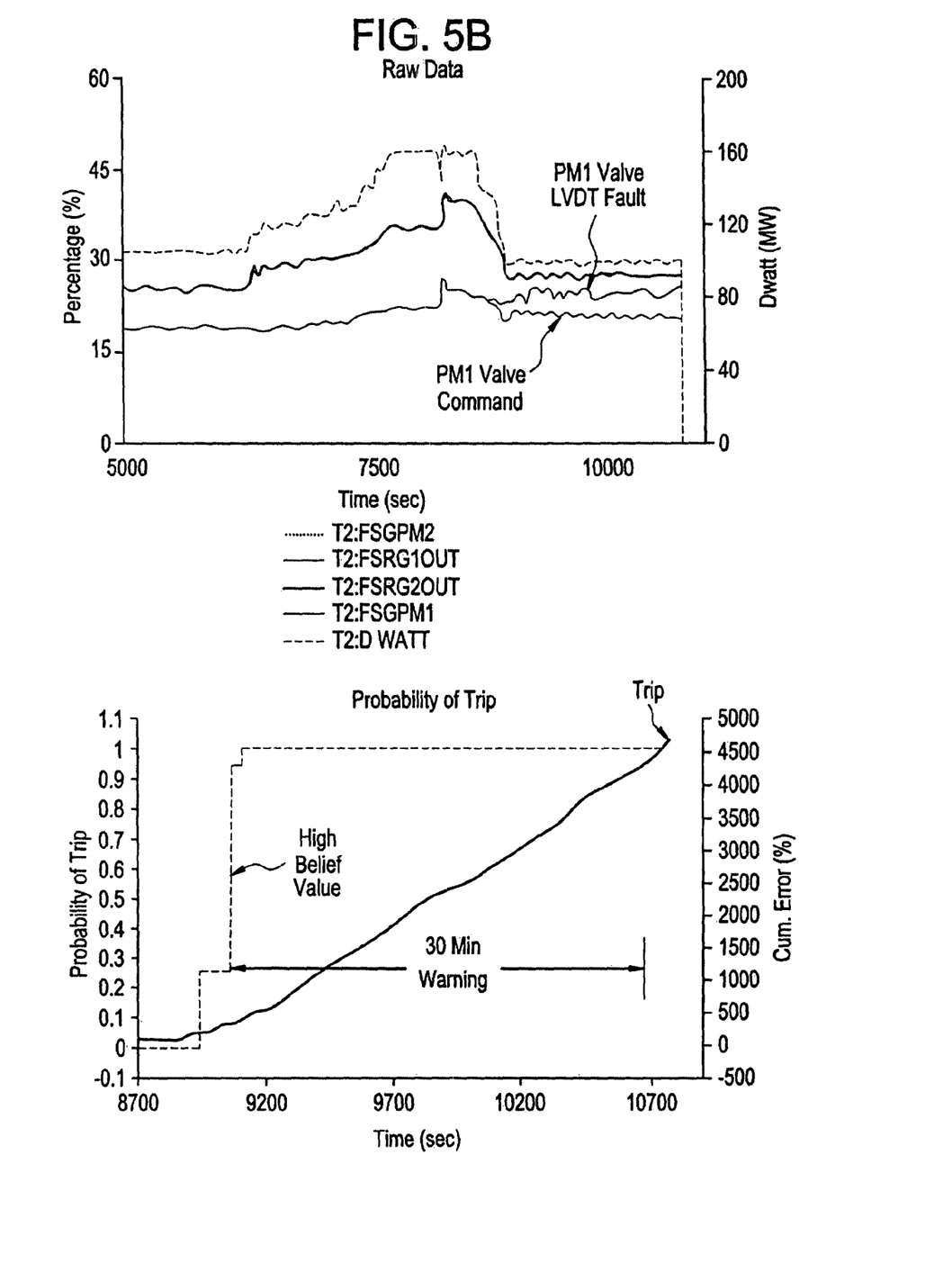
FIG. 5B shows exemplary results for prediction of trips due to GCV failure.
Figure 5C:
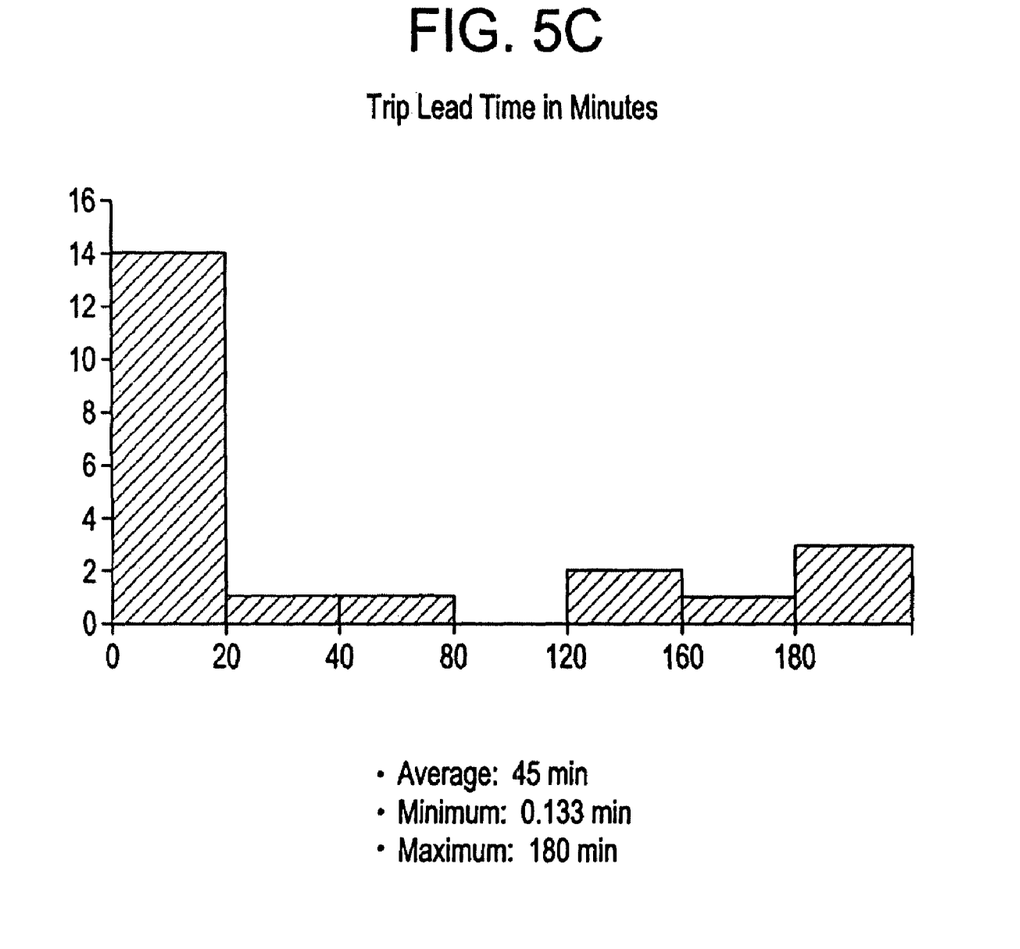
FIG. 5C shows exemplary summary results for prediction of trips due to GCV failures.

FIG. 5C shows exemplary summary results for prediction of trips due to GCV failures. The graph gives the distribution of the lead-time in minutes for various cases tested. As it can be seen, around 50% of the trips, the algorithm was able to provide more than 15 minutes warning time.

Figure 6A:
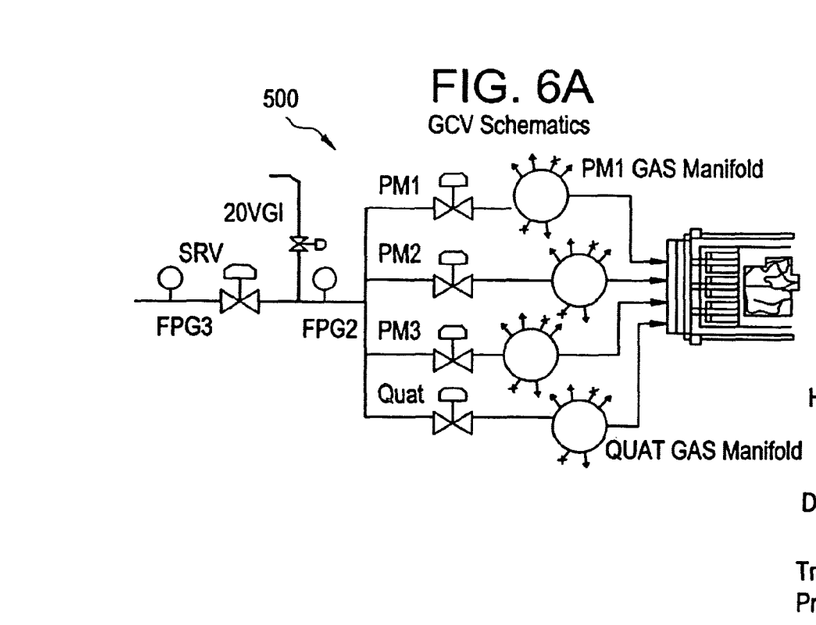
FIG. 6A illustrates a GCV configuration for which exemplary embodiments of the systems and methods can be applied for trip prediction.
Figure 6B:
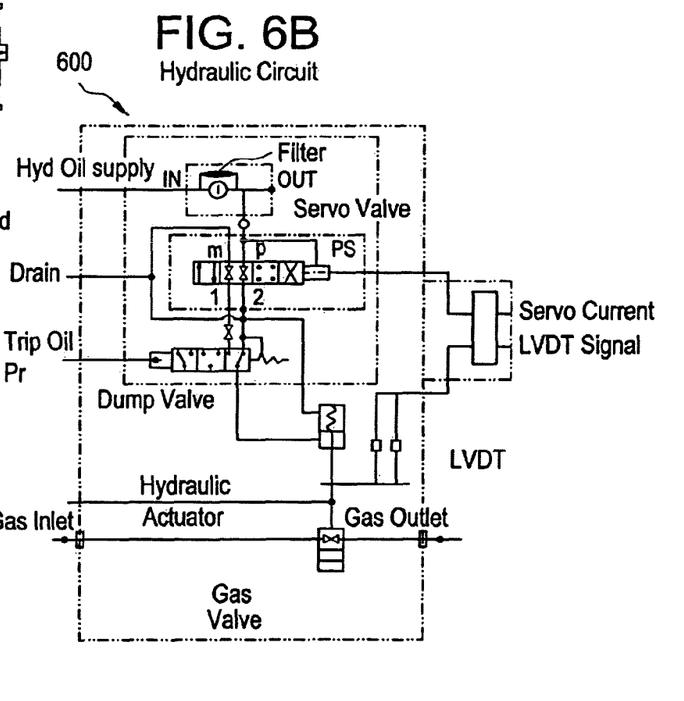
FIG. 6B illustrates a hydraulic circuit configuration for a gas turbine for which exemplary embodiments of the systems and methods can be applied for trip prediction.

As discussed above, the systems and methods described herein can be applied to predict trips due to GCV failures. FIG. 6A illustrates a GCV configuration 500 and FIG. 6B illustrates a hydraulic circuit configuration 600 for a gas turbine for which exemplary embodiments of the systems and methods can be applied for trip prediction. In the present example, local computer 115 collects data such as gas turbine 105 load, speed, GCV open command, GCV position feedback, servo current, firing temperature, etc. Local computer 115 further extracts various statistical and domain bases features from real time gas turbine data. Before calculating various statistical and domain based features, these parameters can be validated at local computer 115 or at remote computer 120. The remote computer 120 can apply various rules to distinguish between transient and steady state operation. The remote computer 120 can further fuse these features by applying Bayesian fusion technique and conditional rules to calculate probability of trip indicator. Ultimately, the above-mentioned features and various rules to provide alarms, recommendations and time to trip. Therefore, real time gas turbine trip prediction due to GCV, position feedback sensors (LVDT) and associated electohydraulic servo system faults can be determined. In addition, real time fault prognostics and diagnostics of electrohydraulic servo system can be determined. Furthermore, methods to predict failures in electrohydraulic servo systems can be developed.

Raw component data related to GCV failures, which is collected by local computer 115, can include but is not limited to: gas turbine MW (DWATT); fuel stroke reference (FSR); gas fuel stroke reference (FSR2); PM1 gas control valve servo command (FSRG1OUT); PM2 gas control valve servo command (FSRG2OUT); PM3 discussed further in the examples below, a formula yielding this conditional probability is derived from Bayesian statistics using Bayes theorem as follows:

$$P(T/E_i) = \frac{P(T) \prod_{i=1...n} P(E_i/T)}{P(T) \prod_{i=1...n} P(E_i/T) + P-(T) \prod_{i=1...n} P(E_i/-T)}$$

that is described further in the examples below.

At step 235, the predicted component failure is classified. At step 240, a prognostic indicator is generated. As discussed above, whenever system 100 raises an indication of an impending trip condition, a case is registered or updated (depending upon when was the last case opened) in the service database 130 with the diagnostics and recommendations (from the rule-based engine), which can be used by the site personnel responsible for taking suitable recommended actions.

Furthermore, data is provided on a predicted time in which action should be taken before an unwanted trip occurs. FIG. 5A illustrates a table that associates prognostic bands with belief thresholds and lead-time ranges, as well as false positive and negative thresholds. In general, belief thresholds can be identified and associated with prognostic bands, which in turn can define lead times in which a user can act. In addition, a prediction is considered a false positive if the methods fail to correctly predict a trip if the prediction is more than some specified time period earlier that the actual time to trip. This time period is considered to be excessive lead-time. Furthermore, a prediction is considered a false negative if the method fails to correctly predict a trip more than some specified time period later than the actual time to trip.

FIG. 5B shows exemplary results for prediction of trips due to GCV failure. The top graph shows data from Premix Values (PM1 to PM3) command and feedback signals. As it can be seen, both the command and feedback signals follow each other except around 8000 seconds. The bottom graph is showing the results of gas control servo command (FSRG3OUT); quaternary gas control valve servo command (FSRGQOUT); PM1 gas control valve feedback (FSGPM1); PM2 gas control valve feedback (FSGPM2); PM3 gas control valve feedback (FSGPM3); Quaternary gas control valve feedback (FSGQ), DLN_mode of operation (DLN_MODE); turbine speed (TNH), etc.

The failure mechanism for a real event and GCV failure are used to extract features in real time. The local computer 115 reads the gas turbine data in real time and computes all these features as given below.

A position error feature is calculated on the basis that a GCV failure manifests itself in a single instance of a position error. The error is based on the difference between the position command and the position feedback. Therefore the error can be represented as PM1, PM2, PM3 and Quat and the cumulative can be represented as PM1_Error Cumulative, PM2_Error Cumulative, PM3_Error Cumulative and Quat Error Cumulative or CUSUM. The following expressions define position error and cumulative position error:

$$\text{PositionError\_PM\#}(t) = (FSSRG\# \ Out(t) - FSGPM\#(t)) \quad (1)$$

where # = 1, 2, 3 and Quat...

$$\text{PositionError\_PM\#\_Cumulative}(t) = \sum_{n=t}^{n=(t-\dot{x})} \text{PositionError\_PM\#}(n) \quad (2)$$

where # = 1, 2, 3 and Quat, x = no of samples

A cumulative position error feature on the basis that a GCV failure manifests itself as a cumulative of position errors. As discussed above a single error is based on the difference between the position command and the position feedback. A faded cumulative error can be represented as the difference between the present value of the cumulative error and the cumulative error value at a time x prior to the cumulative error. The following expression defines faded cumulative error:

$$\text{Faded\_PM\#\_CumulativeError}(t) = (\text{PositionError\_PM\#\_Cumulative}(t) - \text{PositionError\_PM\#\_Cumulative}(t-y)) \quad (3)$$

where #=1, 2, 3 and Quat, y=seconds prior

A further feature of an impending failure is the slope of the cumulative position error which can be represented as the difference between the present cumulative error value and cumulative error value at a time x prior divided by x time period as discussed above. The following expression defined slope position error:

$$\text{Slope\_PositionError\_PM\#\_Cumulative}(t) = \frac{d(\text{PositionError\_PM\#\_Cumulative})}{dt} \quad (4)$$

where # = 1, 2, 3 and Quat...

A difference from expected (DFE) (based on DLN_Mode) feature on the basis that a GCV failure manifests itself by the difference between a baseline error value and a short-term error. The error value can be calculated as mentioned in position error calculation and the baseline value is average of all position error values from the present value to x time period prior (eg. 2 hrs position error value). The short-term error can be calculated by as mentioned baseline error value but the difference is the x time period is less (eg. 10 sec). The baseline and short-term error calculation is carried out each DLN_Mode and for PM1, PM2, PM3 and Quat valve. The following expression defines DFE as discussed:

$$DFE(t) = \sum_{m=t}^{m=(t-x)} \text{PositionError\_PM\#}(n) - \sum_{n=t}^{n=(t-y)} \text{PositionError\_PM\#}(n) \quad (5)$$

where #1, 2, 3 and Quat and n, m = no samples

Similarly, another feature that can be used to predict a GCV failure is the standard deviation of the DFE. The DFE is calculated as mentioned 0026 and rolling standard deviation of DFE is calculated which noting but standard deviation with in x time period. The following expression defines the standard deviation of DFE:

$$STD\_DFE(t) = \text{StandardDeviation}(DFE(t)\ldots DFE(t-\pi)) \text{ where z=no of samples} \quad (6)$$

Another feature that can be used to predict a GCV failure is the standard deviation of the servo current. The following expression defines the standard deviation of the servo current:

$$STD\_FAGPM\#(t) = \text{StandardDeviation}(FAGPM\#(t) - FAGPM\#(t-x)) \text{ where x=no of samples} \quad (6)$$

Features that can be extracted for fusion can further include: features derived from valve command, feedback, servo current, DLN_Mode and other gas turbine parameters. Other features that can be extracted for fusion include, but are not limited to: valve and LVDT abnormality; deviation from expected value; rate of change of command and feedback drift; baseline calculations; abnormality exposure time; abnormality growth rate; standard deviations and DLN mode (e.g., PM1, PM2, PM3, etc.).

Each of these features provides indications that the GCV is malfunctioning. Since one feature alone does not give high confidence of impending trips, these features are fused with a Bayesian belief fusion technique. As discussed above, the formula yielding this probability is:

$$P(T/E_i) = \frac{P(T) \prod_{i=1\ldots n} P(E_i/T)}{P(T) \prod_{i=1\ldots n} P(E_i/T) + P - (T) \prod_{i=1\ldots n} P(E_i/-T)}$$

The fused Bayesian belief value is calculated from the above formula. The features arising from a failed GCV has to meet conditions of the gas turbine controller trip logic to initiate a trip. Features, as described above, are extracted from a failed GCV and these features are fused based upon different GCV failure modes. Various rules are used to determine this fusion. Based upon rules, some features are included or excluded from joint belief calculation and some features are allocated different weights compared to others.

With the above fusion and rules set, a unified fused belief value is computed which is tracked over time. Whenever the fused value exceeds threshold bands, corresponding prognostic indicators are generated by the local computer 115. The data is then transmitted by the communication link to the remote computer 120, which initiates the rule engine and the CBR system 125. Based on the algorithms recommendation, a case is opened in the service database 130. Also, based on the recommendation from the CBR system 125 and the rule engine residing on the remote computer 120, it writes suitable diagnostics and trip mitigation recommendations in the service database 130. The persons concerned, such as a technician at technician computer 110, uses these results to do further analysis (if required) and carry out the recommendations. Furthermore, data is provided on a predicted time in which action should be taken before an unwanted trip occurs. As such several alarms can be triggered, including, but not limited to: a vanishing alarm, a LVDT failure and servo issues alarm, a calibration issue alarm, a time to trip alarm, etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for the prediction of gas turbine trips due to gas control valve failures, the method comprising:
   collecting raw gas turbine operational data; and
   using the raw gas turbine operational data to determine a fused belief of gas control valve failure and to generate a prognostic indicator for the prediction of a remaining time to a turbine trip due to the failed gas control valves, wherein the fused belief of gas control valve failure is a probability based on a domain knowledge of a turbine and on a conditional probability of gas control valve failure.

2. The method as claimed in claim 1, further comprising:
   extracting gas control valve features indicative of a turbine trip from the raw gas turbine operational data;
   applying a rule set to the extracted features;
   determining the fused belief of gas control valve failure, based on an apriori probability and the extracted features; and
   classifying the predicted gas control valve failure, wherein extracting features from the raw gas turbine operational data includes applying domain knowledge to the extracted features.

3. The method as claimed in claim 2 further comprising calculating apriori probability and applying the domain knowledge to the calculated apriori probability.

4. The method as claimed in claim 3 wherein determining the fused belief of failure further comprises applying the calculated apriori probability to the determined fused belief of failure.

5. The method as claimed in claim 1 wherein the gas control valve failure is selected from the group consisting of: electro hydraulic servo system faults; sticking of spool due to poor hydraulic oil quality; loose connection LVDT failures; shorting LVDT failures; sticking and severed valve stem conditions; grounding servo coil failure; open circuit servo coil failure; loose connection servo coil failure; last chance filter choking; hydraulic supply pressure loss/fluctuation; null bias drift; flapper nozzle choking; and air ingress in hydraulic system.

6. The method as claimed in claim 2 wherein the extracted features includes at least one of position error, cumulative position error, slope of cumulative position error, difference from expected based on DLN_Mode, standard deviation of the difference from expected based on DLN_Mode, and standard deviation of current.

7. A system for the prediction of gas turbine trips due to one or more gas control valve failures, the system comprising:
   a turbine;
   a local computer coupled to the turbine for collecting raw turbine operational data related to one or more gas control valve failures from the turbine;
   a remote computer coupled to the local computer;
   a process, residing on the local computer, for computing a prediction of trips, the process including instructions to determine a fused belief of gas control valve failure and to generate a prognostic indicator for the prediction of a remaining time to a turbine trip due to the one or more failed gas control valves, wherein the fused belief of gas control valve failure is a probability based on a domain knowledge of the turbine and on a conditional probability of gas control valve failure; and
   a database coupled to the remote computer for storing information related to a trip of the turbine.

8. The system as claimed in claim 7 wherein the local computer includes a first process for extracting features from the raw component data, the raw component data and the features being indicative of gas control valve failure.

9. The system as claimed in claim 8 wherein the remote computer includes a second process for applying a rule set to the extracted features.

10. The system as claimed in claim 9 wherein the second process includes instructions to:
    perform a trip reduction analysis; and
    generate recommendations to prevent a trip.

11. The system as claimed in claim 9 wherein the database comprises a computer readable medium having a plurality of data nodes stored on the medium and representing a data structure, comprising:
    a first data node stored in a first region of a range of memory addresses in the medium, the first data node representing a time to trip indicator;
    a second data node stored in a second region of a range of memory addresses in the medium, the second data node representing trip mitigation recommendations; and
    an index stored in an index region of the range of memory addresses, the index storing relationship information between the first and second data nodes, wherein the second process includes instructions to generate appropriate action to mitigate the trip.

12. The system as claimed in claim 11 wherein the appropriate action to mitigate the trip is at least one of a graceful shutdown of the turbine and a repair of the failed gas control valve.

13. The method as claimed in claim 8 wherein the gas control valve failure is selected from the group consisting of: electro hydraulic servo system faults; sticking of spool due to poor hydraulic oil quality; loose connection LVDT failures; shorting LVDT failures; sticking and severed valve stem conditions; grounding servo coil failure; open circuit servo coil failure; loose connection servo coil failure; last chance filter choking; hydraulic supply pressure loss/fluctuation; null bias drift; flapper nozzle choking; and air ingress in hydraulic system.

14. The method as claimed in claim 8 wherein the extracted features includes at least one of position error, cumulative position error, slope of cumulative position error, difference from expected based on DLN_Mode, standard deviation of the difference from expected based on DLN_Mode, and standard deviation of current.

15. In a power plant having a turbine, a method for the prediction of gas turbine trips due to gas control valve failures, the method comprising:
    collecting gas control valve failure data having failure signatures from the turbine for collection in a remote computer;
    processing the gas control valve failure data to extract features based on the failure signatures and based on domain knowledge of the turbine;
    applying a rule set on the extracted features based on apriori probability and the domain knowledge; and
    determining a fused belief of gas control valve failure including determining a fused belief of a remaining time to a turbine trip calculated from the rule set applied to the extracted features, wherein the fused belief of gas control valve failure is a probability based on the domain knowledge of a turbine and on the apriori conditional probability of gas control valve failure.

16. The method as claimed in claim 15 further comprising:
    classifying the component failure from the fused belief of failure; and generating a prognostic indicator, wherein the prognostic indicator includes a band of at least one of no trip, low probability of trip, and high probability of trip.

17. The method as claimed in claim 15 wherein the apriori probability is calculated in the remote computer based on sensor fusion methods including at least one of Neamen Pearson method, Demster Shafer method and Bayesian Fusion as follows:

$$P(T/E_i) = \frac{P(T)\prod_{i=1...n} P(E_i/T)}{P(T)\prod_{i=1...n} P(E_i/T) + P-(T)\prod_{i=1...n} P(E_i/-T)}$$

wherein Ei is a conditional probability of obtaining features of the component failure data, P(T) is an apriori belief value for a trip, P(-T) is an apriori belief for no trip, P(Ei/T) is a conditional probability for obtaining features for a trip event, and P(Ei/-T) is a conditional probability for obtaining features for a non-trip event.

18. The method as claimed in claim 15 wherein the gas control valve failure is selected from the group consisting of: electro hydraulic servo system faults; sticking of spool due to poor hydraulic oil quality; loose connection LVDT failures; shorting LVDT failures; sticking and severed valve stem conditions; grounding servo coil failure; open circuit servo coil failure; loose connection servo coil failure; last chance filter choking; hydraulic supply pressure loss/fluctuation; null bias drift; flapper nozzle choking; and air ingress in hydraulic system.

19. The method as claimed in claim 15 wherein the extracted features includes at least one of position error, cumulative position error, slope of cumulative position error, difference from expected based on DLN_Mode, standard deviation of the difference from expected based on DLN_Mode, and standard deviation of current.

20. The method as claimed in claim 15 further comprising generating an appropriate action to mitigate a trip of the gas turbine, wherein the appropriate action to mitigate the trip is at least one of a graceful shutdown of the turbine and a repair of the failed component.

21. The method as claimed in claim 1 wherein collecting the raw gas turbine operational data comprises obtaining DLN_Mode data of the gas turbine.

22. The method as claimed in claim 1 wherein collecting the raw gas turbine operational data comprises obtaining servo current data of the gas turbine.

* * * * *

UNITED STATES PATENT AND TRADEMARK OFFICE
CERTIFICATE OF CORRECTION

PATENT NO. : 8,250,017 B2
APPLICATION NO. : 11/843951
DATED : August 21, 2012
INVENTOR(S) : Pandey et al.

It is certified that error appears in the above-identified patent and that said Letters Patent is hereby corrected as shown below:

In Column 2, Line 60, delete "to" and insert -- to: --, therefor.

In Column 4, Line 5, delete "estimation," and insert -- estimation --, therefor.

In Column 4, Line 25, delete "X," and insert -- $X_v$ --, therefor.

In Column 4, Line 51, delete " $F_f(\ddot{x}_p)$ " and insert -- $F_f(\dot{x}_p)$ --, therefor.

In Column 4, Line 53, delete " $\ddot{x}_p$ " and insert -- $\dot{x}_p$ --, therefor.

In Column 4, Line 57, delete "Demster" and insert -- Dempster --, therefor.

In Column 4, Line 64, delete "computer" and insert -- compute --, therefor.

In Column 5, Lines 9-50, delete "the algorithms.......... (FSRG2OUT); PM3" and insert the same in Column 6, at Line 24, after "the result of".

In Column 5, Line 40, delete "electohydraulic" and insert -- electrohydraulic --, therefor.

In Column 5, Line 58, in Equation, delete "P-(T)" and insert -- P(-T) --, therefor.

In Column 7, Line 45, in Equation (6), delete "DFE(t-π))" and insert -- DFE(t-z)) --, therefor.

In Column 8, Line 4, in Equation, delete "P-(T)" and insert -- P(-T) --, therefor.

In Column 10, Line 30, in Claim 13, delete "method" and insert -- system --, therefor.

Signed and Sealed this
Eighteenth Day of December, 2012

David J. Kappos
*Director of the United States Patent and Trademark Office*

CERTIFICATE OF CORRECTION (continued)
U.S. Pat. No. 8,250,017 B2

In Column 10, Line 41, in Claim 14, delete "method" and insert -- system --, therefor.

In Column 11, Line 7, in Claim 17, delete "Demster" and insert -- Dempster --, therefor.

In Column 11, Line 13, in Claim 17, delete "P-(T)" and insert -- P(-T) --, therefor.